United States Patent [19]
Kumar

[11] Patent Number: 6,043,996
[45] Date of Patent: Mar. 28, 2000

[54] METHOD AND APPARATUS FOR REDUCING MONOTONIC AUDIBLE NOISE IN A POWER CONVERSION SYSTEM

[75] Inventor: Ajith Kuttannair Kumar, Erie, Pa.

[73] Assignee: General Electric Company, Erie, Pa.

[21] Appl. No.: 09/243,657

[22] Filed: Feb. 3, 1999

[51] Int. Cl.[7] .......................... H02M 1/12; H02M 3/335; H02P 3/12

[52] U.S. Cl. ................. 363/41; 363/26; 318/375

[58] Field of Search .................. 363/41, 96, 97, 363/26, 28, 71, 40; 318/760, 759; 307/82; 323/271

[56] References Cited

U.S. PATENT DOCUMENTS

| | | |
|---|---|---|
| 3,890,551 | 6/1975 | Plunkett . |
| 4,190,882 | 2/1980 | Chevalier et al. ..................... 363/26 |
| 4,339,697 | 7/1982 | Franz . |
| 4,409,534 | 10/1983 | Bose . |
| 4,638,417 | 1/1987 | Martin, Jr. et al. . |
| 4,761,600 | 8/1988 | D'Atre et al. ........................ 318/759 |
| 5,396,214 | 3/1995 | Kumar . |
| 5,414,615 | 5/1995 | Kumar et al. . |
| 5,442,535 | 8/1995 | Bourgeios . |
| 5,528,486 | 6/1996 | Kumar et al. . |
| 5,682,303 | 10/1997 | Goad ..................................... 363/71 |

OTHER PUBLICATIONS

Muhammad H. Rashid, Chapter 10 titled Pulse–width–modulated Inverters, "Power Electronics, Circuits, Devices and Applications" 2nd ed., 1993.

*Primary Examiner*—Peter S. Wong
*Assistant Examiner*—Rajnikant B. Patel
*Attorney, Agent, or Firm*—Ann M. Agosti; Jill M. Breedlove

[57] ABSTRACT

A method for reducing audible monotonic noise in a power conversion system (10) using one or more controllable converters (20, 120, 26, and 136) includes generating a set of pulse width modulated (PWM) signals so that each converter has a different average switching frequency, and randomly varying successive cycle time intervals of the generated signals so that a respective instantaneous frequency shift relative to the respective average switching frequency of the converters is achieved over each of the time intervals.

20 Claims, 4 Drawing Sheets

METHOD AND APPARATUS FOR REDUCING MONOTONIC AUDIBLE NOISE IN A POWER CONVERSION SYSTEM

BACKGROUND OF THE INVENTION

The present invention generally relates to power conversion systems used in AC propulsion or traction motors and, more particularly, to an improved method for control of such systems so as to reduce audible monotonic noise which may be produced during motoring and electrical braking.

Kumar, U.S. Pat. No. 5,396,214, describes a power conversion system including electric power converters, such as inverters using any of various well-known pulse width modulation ("PWM") techniques, to control the motors during a motoring mode of operation and dynamic braking circuits including other converters, such as DC choppers which may use similar PWM techniques as used in the inverters, to control power conversion during an electrical braking mode of operation. During motoring, the traction motors and inverters may produce audible noise having a level and frequency generally determined by many factors including the value of the PWM switching frequency of inverter operation. The noise, especially monotonic noise, that is, noise primarily containing a generally steady energy level in a relatively narrow frequency band, can be irritating to the average listener. Similarly, during electrical braking, the traction motors, the inverters and the dynamic braking circuits may produce audible noise resembling the type of noise produced during motoring.

The foregoing noise condition can become even more troublesome when multiple converters, such as the inverters coupled to respective sets of the traction motors, or the DC choppers in the dynamic braking circuits, use PWM signals having the same frequency, as the combined effect of such operation can exacerbate an already annoying condition.

Several approaches for reducing these noise levels have been proposed heretofore but each such approach suffers from significant drawbacks. These approaches include adding sound reduction barriers around the propulsion equipment, changing the motor designs, controlling the resonance frequencies of the system, and achieving higher PWM switching frequencies. These approaches, unfortunately, are expensive to implement, particularly if the equipment is already designed and built, and generally such approaches introduce additional equipment weight due to added material and/or components. Additional weight leads to reduced available power for transporting cargo and/or passengers.

SUMMARY OF THE INVENTION

Generally speaking, the present invention fulfills the foregoing needs by providing a method for reducing acoustical noise in a power conversion system having at least one converter, such as an inverter or a DC chopper, having a respective average switching frequency. The method comprises generating a set of PWM signals and varying predetermined cycle time intervals of the generated signals so that a respective instantaneous frequency shift relative to the respective average switching frequency of the converter is achieved over each of the intervals.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
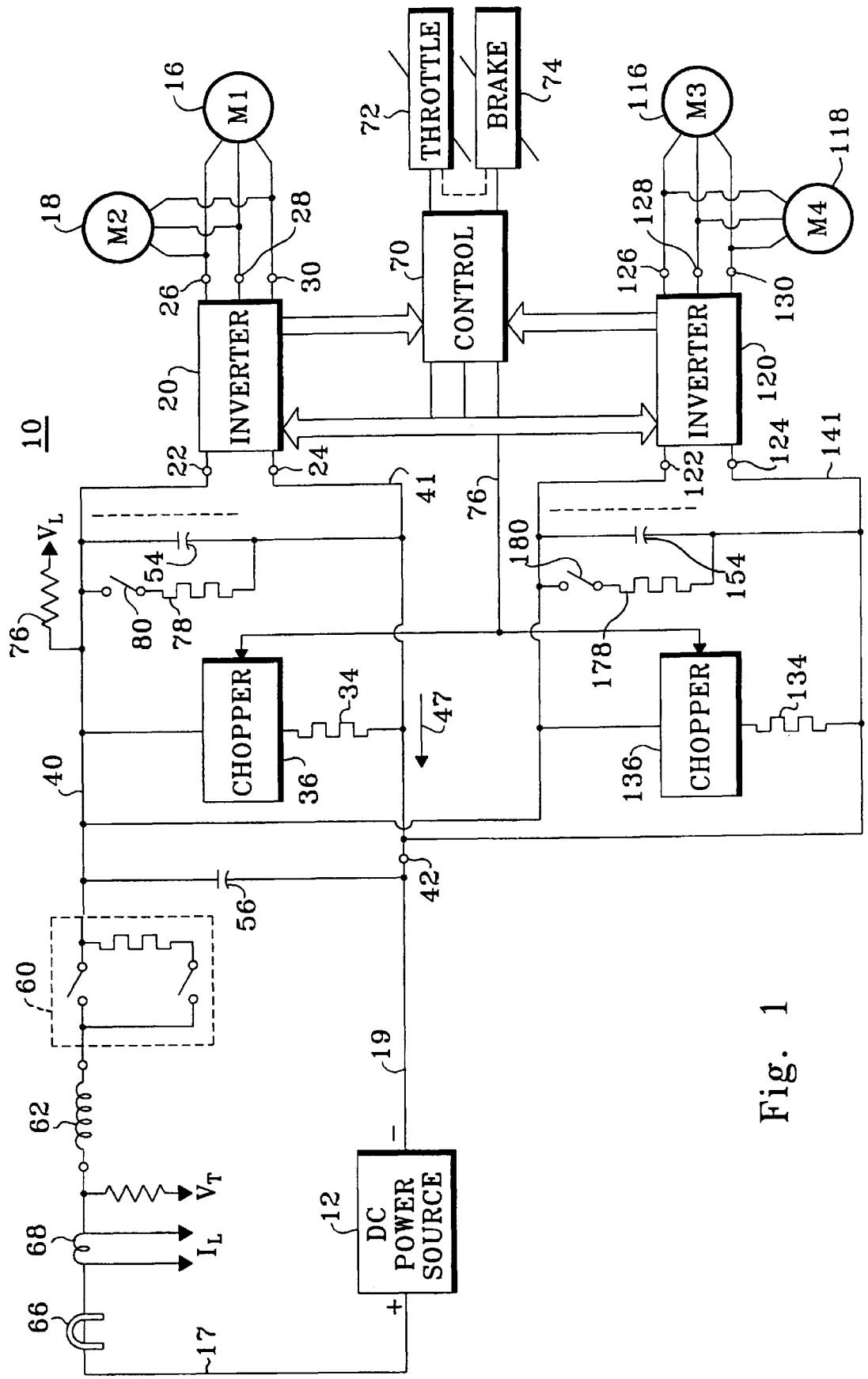
FIG. 1 is an electrical diagram of one exemplary electric power conversion system with which the present invention may be used.

To generate an understanding of the present invention, reference is first made to FIG. 1, which shows a power conversion system 10 for conveying power between a DC power source 12 and an electric load comprising first and second motors 16 and 18 electrically connected in parallel. The motors 16 and 18 are three-phase AC induction-type traction motors used for propelling a vehicle, such as a transit vehicle or locomotive (not shown), and the DC source 12, in the case of a transit vehicle, may comprise a wayside power distribution system including either a third rail or an overhead catenary with which a current collector on the vehicle makes sliding or rolling contact. In FIG. 1, the relatively positive line 17 represents such a current collector, and the negative line 19 represents a conductor in contact with a grounded rail serving as the other terminal of the DC source. Alternatively, the power conversion system 10 on board the vehicle may be connected to the source via a two-wire trolley in contact with two parallel conductors of an overhead catenary.

The power conversion system 10 includes a controllable DC-to-AC converter, such as an inverter 20 having a pair of DC terminals 22 and 24 on its source side and a set of three AC terminals 26, 28, and 30 on its motor side. The DC terminal 22 is connected via a conductor 40 to the line 17 of the positive potential, and the terminal 24 is connected via relatively negative conductors 41 and 42 to the other line 19 of the DC power source 12. The conductors 40-42 thus serve as a DC link between the source 12 and the inverter 20. The AC terminals 26, 28, and 30 are respectively connected to the three different phases of each of the AC motors 16 and 18.

During motoring, i.e., when electrical power is being conveyed from the source to the motors, direct current is supplied to the inverter through its DC terminals 22 and 24, and the inverter operates to convert this direct current into alternating current supplied through AC terminals 26, 28, and 30 to the motors 16 and 18. The inverter is controlled by suitable controls which may be internal or external (such as shown by a controller 70 in FIG. 1) for varying the amplitude and frequency of the alternating voltage at its AC terminals to provide the needed acceleration or deceleration of the vehicle driven by the motors 16 and 18.

As will be appreciated by those skilled in the art, any well known pulse width modulation (PWM) control technique, such as sine-triangle comparison, space vector modulation or duty cycle area modulation, can be used for inverter operation. See for example the textbook titled "Power Electronics, Circuits, Devices and Applications" by Muhammad H. Rashid, [2nd ed., (1993)] available from Prentice Hall, Upper Saddle River, N.J. 07458, and in particular Chapter 10 thereof titled, "Pulse-width-modulated Inverters" for a discussion of various PWM techniques. The controller may comprise a computer or a microprocessor, for example.

The power conversion system 10 has alternative motoring and electrical braking modes of operation. During electrical braking, each of the motors 16 and 18 operates as an electrical generator driven by the inertia of the transit vehicle, returning power to the system 10. This return power flows through the inverter 20 in a reverse direction from the direction of flow during motoring and appears as a unipolarity voltage and direct current at the DC terminals 22 and 24.

The conversion system 10 is designed to provide for both dynamic braking and regenerative braking. Dynamic braking is effected by connecting across the conductors 40 and 42 of the DC link a dynamic braking resistor 34 through which at least some of the braking current can be made to flow, thus dissipating electric energy in the form of heat. For controlling current in the resistor 34, a DC-to DC converter, such as a DC power chopper 36 is connected in series therewith. As is well known to persons skilled in the art, the chopper 36 is a solid-state switch that can be repetitively turned on and off by controller 70, for example, which, in one form, controls the ratio of the "on time" to the "off time" during successive intervals each of fixed duration. The average magnitude of current in the resistor varies directly with this ratio.

For attenuating harmonics generated by operation of the power conversion system 10 and for effectively isolating the system from any undesirable electrical transients in the DC power source 12, a single-stage electrical filter of the L-C type is included in the connections between the source 12 and the inverter 20. The filter may comprise a series line-filter inductor 62 connected in the path of current between the line 17 and the positive conductor 40 of the DC link, and shunt capacitors 54 and 56. The first capacitor 54 (referred to as the DC link capacitor) spans the conductors 40 and 41 and thus is directly connected between the two DC terminals 22 and 24 of the inverter. The second capacitor 56 (referred to as the line capacitor) spans the conductors 40 and 42 and thus is interconnected in parallel with the capacitor 54. The filter serves to attenuate harmonics generated by operation of the inverter 20 so that such harmonics are isolated from the DC source 12 and will not interfere with the usual wayside signaling system. During motoring, the DC link capacitor 54 serves mainly as the required "stiff " voltage source for the inverter 20. In the electrical braking mode of operation, the line capacitor 56 serves mainly as a filter for the chopper 36, providing a temporary path for braking current during the off periods of the chopper in the dynamic braking circuit (which comprises resistor 34 and chopper 36) which, as can be seen in FIG. 1, is connected across this capacitor.

For disconnecting the power conversion system 10, an electric circuit breaker 60, applied in a conventional manner, is provided between the system and the DC power source. This circuit breaker 60 is operated by the controller 70 in response to an operator's command or to fault conditions forcing the circuit breaker to an open condition. In the illustrative system of FIG. 1, a closed contactor 66 may represent a current collector in sliding contact with a wayside conductor. The contactor 66 may be a pantograph for an overhead conductor or a spring biased shoe for contacting a third rail.

Current to the propulsion system is monitored by a current monitor 68 of a type well known in the art. Monitor 68 generates a signal $I_L$ representative of the magnitude and frequency of current in the DC conductor 40. The voltage at DC link conductor 40 is indicated by signal $V_L$ obtained through buffer resistor 76 connected to conductor 40. The filter capacitors 54 and 56 can be discharged through discharge resistor 78 via discharge contactor 80. The discharge of capacitor 54 and 56 may be desirable for safety during maintenance.

In a typical transit vehicle, there will be a second voltage source inverter, in addition to the inverter described above, for supplying alternating current to two more traction motors for propelling the vehicle. FIG. 1 illustrates a power conversion system including such an additional inverter and with third and fourth AC motors being connected to the set of the AC terminals on its motor side. Components common to those described above are designated by the same reference numerals plus 100.

The positive DC terminal 122 on the source side of the second inverter 120 is connected, via the conductor 40 of the DC link, to the line 17 of positive potential, and the relatively negative DC terminal 124 is connected, via a separate conductor 141 and the common conductor 42, to the other line 19 of the DC power source 12. The AC terminals 126, 128, and 130 of the inverter 120 are respectively connected to three different phases of each of the AC motors 116 and 118. A second DC link capacitor 154 individually associated with the inverter 120, is directly connected between the DC terminals 122 and 124, and a line capacitor 56 shared by both of the inverters 20 and 120 and both of the choppers 36 and 136 span the conductors 40 and 42 of the DC link capacitors 54 and 154 during the motoring mode of operation of the conversion system.

As is shown FIG. 1, a second dynamic braking circuit, comprising the series combination of another dynamic braking resistor 134 and a second electric power chopper 136, is connected between the DC link conductors 40 and 42 and hence across the line capacitor 56.

In addition to sharing the common shunt line capacitor 56, the two inverters 20 and 120 utilize the same series line-filter inductor 62 which is connected on the DC power source side of the capacitor 56 between the DC link conductor 40 and the line 17.

The two inverters 20 and 120 can be controlled by controller 70 which responds to alternative command signals from interlocked throttle and brake controllers 72 and 74, respectively. The controller 70 also receives feedback signals representative of sensed values of voltage, current, and other selected variables in each of the inverters 20 and 120. To operate in a dynamic braking mode, the controller 70 derives a train of suitably timed periodic signals that determine the repetitive on and off intervals of the choppers 36 and 136, and it varies the ratio of these intervals as desired. As suggested above, if the inverters or DC choppers are operated using the same PWM switching frequency, then generation of monotonic noise is likely to result both during the dynamic braking and the motoring modes of operation.

Figure 2:
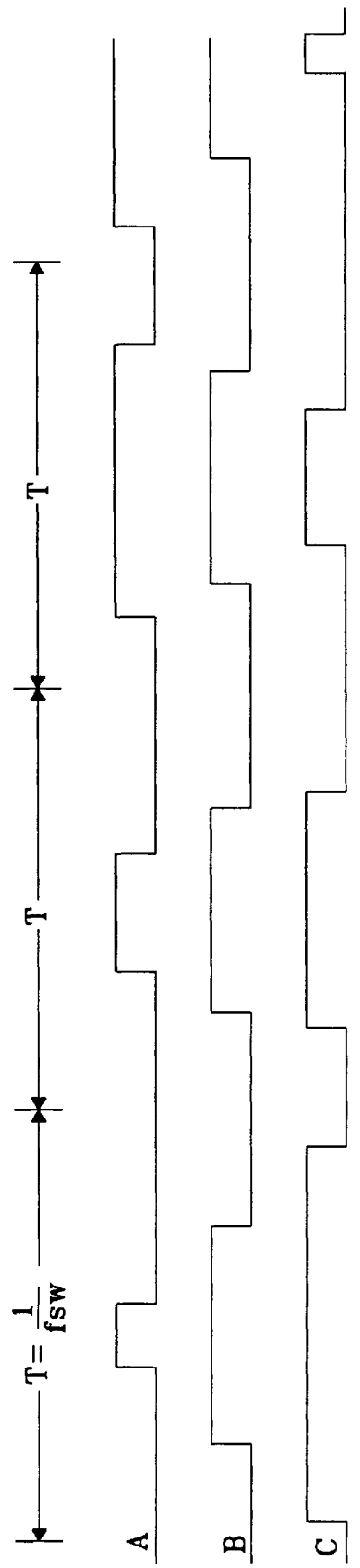
FIG. 2 shows an exemplary set of PWM signals as may be used for controlling operation of either of the inverters shown in FIG. 1.

FIG. 2 shows an exemplary set of pulse width modulated signals which as discussed above can be generated by techniques well known in the art. See for example commonly assigned U.S. Pat. Nos. 4,409,534, 5,414,615 and 5,528,486, each discussing various PWM techniques for AC traction inverter control. As shown in FIG. 2, the PWM switching frequency is simply the reciprocal value of the PWM cycle time T, that is, $T=1/f_{SW}$.

Figure 3:
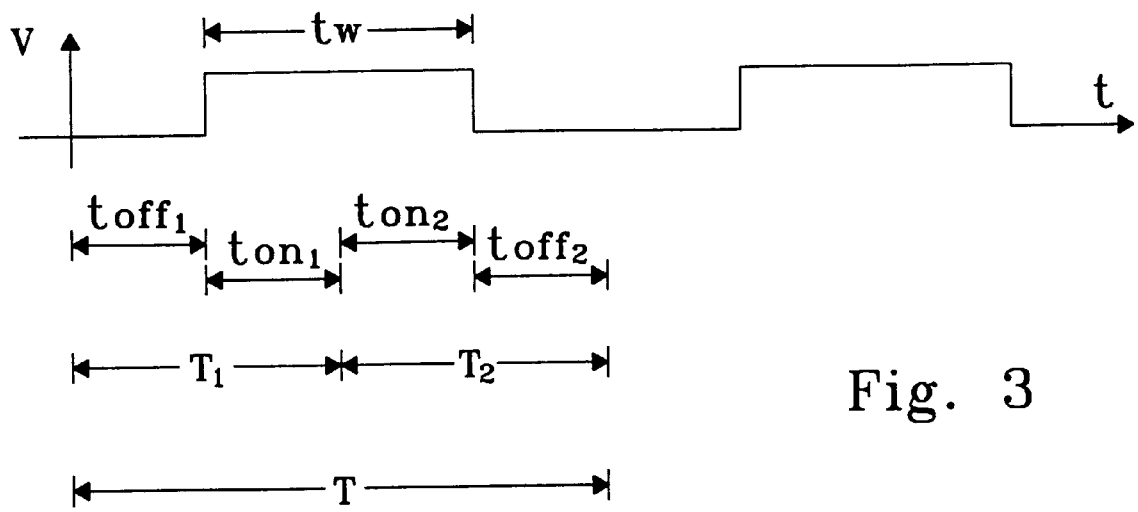
FIG. 3 shows one example of a PWM signal processed using prior art techniques.

FIG. 3 shows an exemplary PWM signal processed in accordance with the prior art, and for ease of explanation assumes operation at a 50% duty cycle. As shown in FIG. 3, PWM cycle time T is split into two substantially equal cycle time intervals $T_1$ and $T_2$, $T_1=T_2=(\frac{1}{2})*T=1/(2*f_{SW})$. In this example, if instantaneous values of the switching frequency over the intervals $T_1$ and $T_2$ were measured, there would not be any substantial measurable frequency shift over any of those intervals and the switching frequency would remain substantially constant over the cycle time intervals $T_1$ and $T_2$. In this example, $t_{off1}=t_{on1}=t_{on2}=t_{off2}$ and no PWM pulse starts until a time $t_{off1}=(\frac{1}{2})*T_1=(\frac{1}{4})*(1/f_{SW})$ has elapsed upon start of cycle time interval $T_1$. At that time, the PWM pulse will begin and will last for time $t_W=t_{on1}+t_{on2}=(\frac{1}{2})*T_1+(\frac{1}{2})*T_2=(\frac{1}{2})*T$. The pulse remains off for the rest of the interval, to $t_{off2}=(\frac{1}{2})*T_2$. Thus, the times for switching or actuating the power switches or electrical valves in the inverter are readily ascertainable from the foregoing computations.

Figure 4:
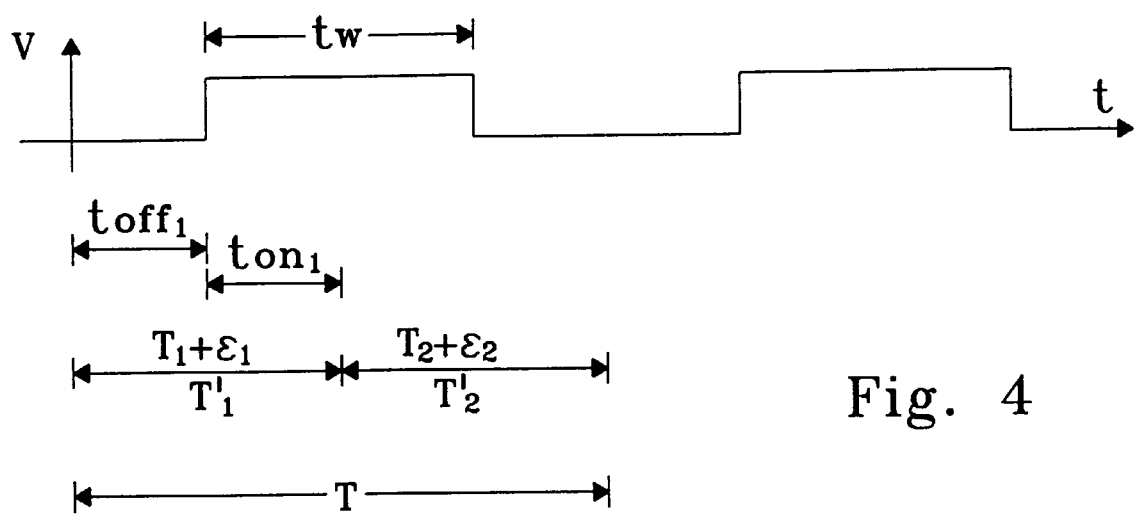
FIG. 4 shows the PWM signal of FIG. 3 processed in accordance with the techniques of the present invention.

FIG. 4 shows a PWM signal processed in accordance with the teachings of the present invention and once again, for ease of explanation, assumes a duty cycle of 50%. As will be now appreciated by those skilled in the art, an instantaneous frequency shift can be realized by adding a random variable signal which may have a value $\epsilon_1$ during cycle time interval $T'_1$ and a different value $\epsilon_2$ during cycle time interval $T'_2$. Thus, $T'_1$ and $T'_2$ are unequal, with $T'_1=(1/(2*f_{SW}))+\epsilon_1$ and $T'_2=1/(2*f_{SW}))+\epsilon_2$. Consequently, there is a respective frequency shift over each of the intervals $T'_1$ and $T'_2$. By repeating the above described processing for each successive cycle time of the PWM signal and selecting the values of the random signal to be bounded by suitable positive or negative limits, then the average or arithmetic mean of the switching frequency would remain unchanged. By way of example, limit values of about +/−10% of the cycle time interval have presently been determined to provide acceptable performance. In this example, no PWM pulse starts until time $t_{off1}=(\frac{1}{2})*T'_1=(\frac{1}{4})*(1/f_{SW})+(\frac{1}{2})*\epsilon_1$ has elapsed since the beginning of the cycle time $T'_1$. At that time, the PWM pulse will begin and will last for time $t_W=t_{on1}+t_{on2}=(\frac{1}{2})*T'_1+(\frac{1}{2})*T'_2=(\frac{1}{2})*T+(\frac{1}{2})*(\epsilon_1+\epsilon_2)$. The PWM pulse will remain off for the rest of the interval, $t_{off2}=(\frac{1}{2})*T'_2=(\frac{1}{4})*(1/f_{SW})+(\frac{1}{2})*\epsilon_2$. Thus, the times for switching or actuating the power switches or electrical valves in the inverter can be readily ascertainable from the foregoing computations which take into account that, due to the insertion of the random variable signal cycle, time intervals $T'_1$ and $T'_2$ are no longer substantially identical to one another. Those skilled in the art, will appreciate that the foregoing processing is not limited to fifty percent (50%) duty cycle operation since any required duty cycle can be readily accommodated by the techniques of the present invention.

Figure 5:
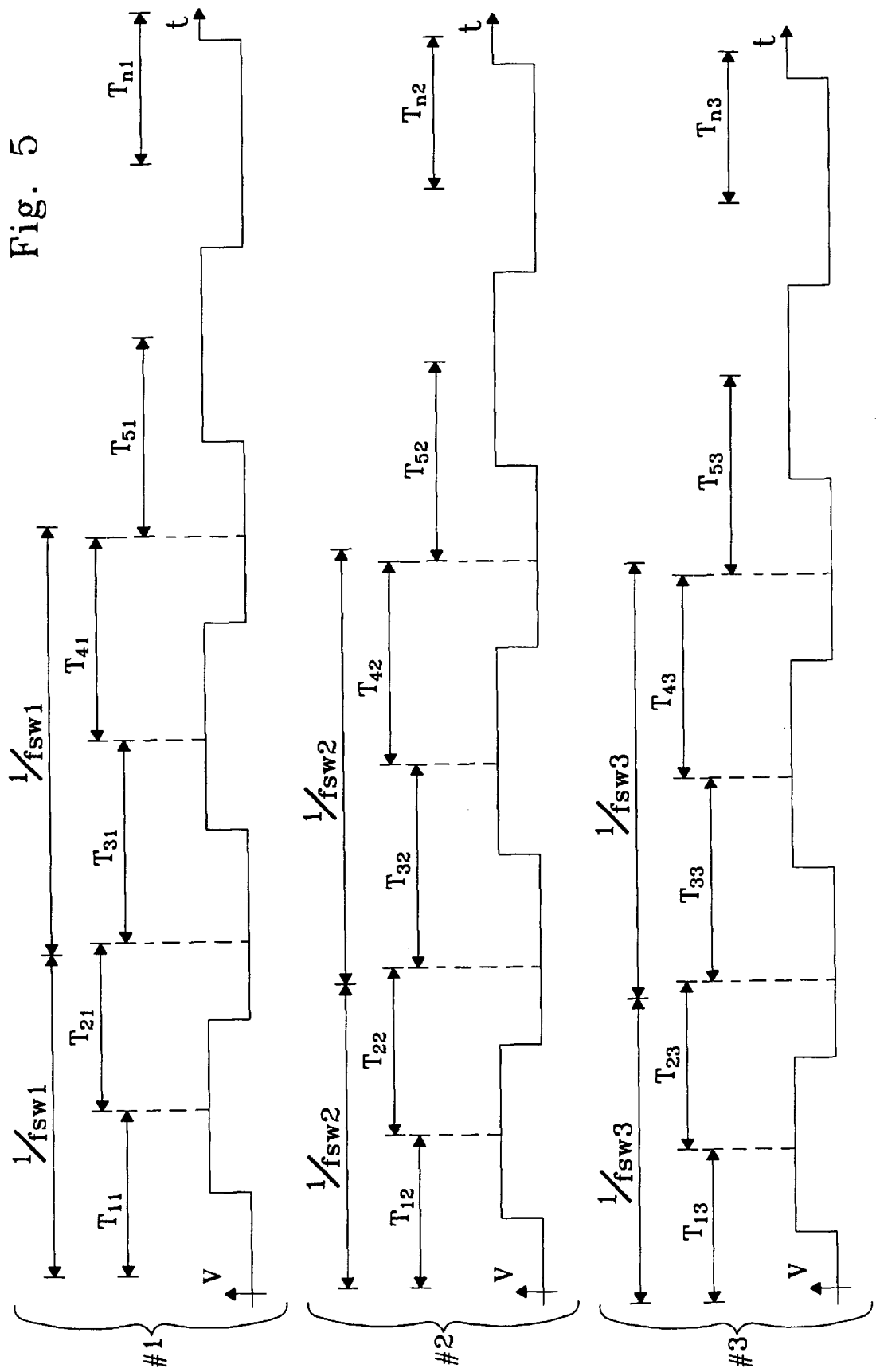
FIG. 5 shows an exemplary set of PWM signals as may be used for operation of multiple converters in accordance with the teachings of the present invention.

FIG. 5 illustrates how the above-described processing technique can be used for each successive cycle time intervals in the PWM signals, and for multiple converters in the system. It will be understood by those skilled in the art that the processing techniques of the present invention may be advantageously used either for the operation of the inverters during the motoring mode of operation or for the operation of the inverters and DC choppers during the electrical braking mode of operation. Although the discussion given above presumes operation of a PWM inverter, it will be appreciated that the present invention is not limited to inverter operation being that other converters, such as the DC choppers in the dynamic braking circuits, using similar PWM techniques may equally benefit from the teachings of the present invention. In the general case, the processing technique can be mathematically described by the following equation:

$$T_{nm} = \frac{1}{2 \times fsw_m} + \varepsilon_{nm},$$

wherein $T_{nm}$ represents the nth cycle time interval for the mth converter, $\epsilon_{nm}$ represents the random variable signal value for the nth cycle time interval of the mth converter, and $fsw_m$ represents the average switching frequency for the mth converter, that is, a frequency value computed for a relatively large number of cycle time intervals. For example, in the case of n=20, then the average or mean switching frequency would be the sum of the 20 instantaneous frequency values corresponding to such intervals divided by 20.

For example, as suggested above in the context of FIG. 4, the first full PWM cycle time of converter #1 can be divided into two cycle time intervals, $T_{11}$ and $T_{21}$ equivalent to the half cycle time intervals $T'_1$ and $T'_2$ shown in FIG. 4. To effectuate an instantaneous frequency shift within these cycle time intervals, random variable signal value $\epsilon_{11}$ is added to $T_{11}$, and random variable signal value $\epsilon_{21}$ is added to $T_{21}$. Similarly, the second full PWM cycle time in converter #1 can be divided into two cycle time intervals, $T_{31}$ and $T_{41}$. To effectuate another instantaneous frequency shift within these respective cycle time intervals, random variable signal value $\epsilon_{31}$ is added to $T_{31}$, and random variable signal value $\epsilon_{41}$ is added to $T_{41}$. Each successive PWM cycle time interval of converter #1 can be varied using the foregoing process. By choosing the values of the random variable signal so that such values do not to exceed a predetermined positive or negative value, then the average switching frequency of converter #1 can be maintained substantially constant.

The PWM cycle time of converter #2 can be similarly shifted. For example, the first full PWM cycle time of converter #2 can be divided into two cycle time intervals, $T_{12}$ and $T_{22}$. To effectuate a respective instantaneous frequency shift within these respective cycle time intervals, a random variable signal value $\epsilon_{12}$ can be added to interval $T_{12}$, and a random variable signal value $\epsilon_{22}$ can be added to $T_{22}$. Next, the second cycle time in converter #2 can be divided into two intervals, $T_{32}$ and $T_{42}$. To effectuate a respective instantaneous frequency shift within these respective cycle time intervals, a random variable signal value $\epsilon_{32}$ is added to interval $T_{32}$, and random variable $\epsilon_{42}$ is added to interval $T_{42}$. Each successive PWM cycle time interval of converter #2 can be varied using the foregoing process. By choosing the values of the random variable signal so that such values do not to exceed a predetermined positive or negative value, then the average switching frequency of converter #2 can be maintained substantially constant.

The foregoing process can be conveniently used to randomly shift each half PWM cycle time interval of the PWM signals of any additional converters. In particular, when the average PWM switching frequency of each converter is chosen to have a different frequency value with respect to one another then such multi-frequency operation of the converters, allows for substantially reducing the generation of audible monotonic noise compared to prior art systems with multiple converters operating at identical PWM switching frequencies. By way of example and not of limitation, in the case of a two inverter implementation, for one of the inverters an average switching frequency of 540 Hz was chosen while the other inverter was chosen to have an average switching frequency of 590 Hz. The respective $\epsilon$ limits were chosen in this example to be approximately 92 and 86 μseconds. Further, the foregoing process can be conveniently used for noise reduction both during the electrical braking and the motoring modes of operation.

It will be understood that the specific embodiment of the invention shown and described herein is exemplary only. Numerous variations, changes, substitutions and equivalents will now occur to those skilled in the art without departing from the spirit and scope of the present invention. Accordingly, ft is intended that all subject matter described herein and shown in the accompanying drawings be regarded as illustrative only and not in a limiting sense and that the scope of the invention be solely determined by the appended claims.

I claim:

1. A method for reducing acoustical noise in a power conversion system having at least two converters each having a respective average switching frequency, the method comprising:

generating a set of pulse width modulated signals;

varying predetermined cycle time intervals of the generated signals so that a respective instantaneous frequency shift relative to the respective average switching frequency of each converter is achieved over each respective one of the intervals; and selecting the values of the respective average switching frequencies to be sufficiently distinct from one another so as to reduce the level of acoustic noise produced by the system.

2. The method of claim 1 wherein the acoustical noise comprises monotonic noise.

3. The method of claim 2 wherein varying comprises randomly varying each of the predetermined intervals.

4. The method of claim 3 wherein varying further comprises selecting predetermined positive and negative values so that the cycle time variation over each of the intervals is bounded by the values.

5. The method of claim 4 wherein the power conversion system includes additional converters each having a distinct average switching frequency.

6. The method of claim 5 further including:

generating additional sets of pulse width modulated signals;

varying predetermined cycle time intervals of the additional sets of pulse width modulated signals so that a respective instantaneous frequency shift relative to each respective average switching frequency of the additional converters is achieved over each respective one of the intervals.

7. The method of claim 6 wherein the predetermined cycle time intervals are half cycle time intervals.

8. The method of claim 7 wherein the at least two converters and the additional converters comprise respective inverters operable in a motoring mode of operation or in an electrical braking mode of operation.

9. The method of claim 7 wherein the at least two converters and the additional converters comprise respective electric power choppers operable in an electrical braking mode of operation.

10. A method for reducing monotonic noise in a power conversion system having a plurality of converters, each converter having a respective distinct average switching frequency fsw, the method comprising:

generating respective sets of pulse width modulated signals for each of the converters; and varying predetermined cycle time interval $T_{nm}$ of the generated signals in accordance with the following equation:

$$T_{nm} = \frac{1}{2 \times fsw_m} + \varepsilon_{nm},$$

wherein n corresponds to a positive integer indicative of the nth cycle time interval and m corresponds to a positive integer indicative of the mth converter in the power conversion system and $\varepsilon_{nm}$ is a random variable signal varying in time so that a corresponding frequency shift relative to the respective average switching frequency of the mth converter is achieved over each of the intervals, the random signal having a value selected not to exceed predetermined positive and negative limits.

11. The method of claim 10 wherein the predetermined cycle time intervals are half cycle time intervals.

12. The method of claim 11 wherein the plurality of converters comprises respective inverters (20 and 120) operating in a motoring mode of operation or in an electrical braking mode of operation.

13. The method of claim 11 wherein the plurality of converters comprises respective electric power choppers (30 and 136) operating in an electrical braking mode of operation.

14. An apparatus for reducing acoustical noise in a power conversion system having at least two converters having a distinct average switching frequency, the apparatus comprising:

a controller for generating a set of pulse width modulated switching signals for control of the at least one converter, the controller varying predetermined cycle time intervals so that a respective instantaneous frequency shift relative to the respective average switching frequency of the at least one converter is achieved over each respective one of the intervals.

15. The apparatus of claim 14 wherein the controller randomly varies each of the predetermined intervals.

16. The apparatus of claim 15 wherein the controller varies each of the predetermined intervals by selecting predetermined positive and negative values so that the cycle time variation over each of the intervals is bounded by the values.

17. The apparatus of claim 16 wherein the power conversion system includes additional converters each having a distinct average switching frequency.

18. The apparatus of claim 17 wherein the controller generates additional sets of pulse width modulated signals by varying predetermined cycle time intervals of the additional sets of pulse width modulated signals so that a respective instantaneous frequency shift relative to each respective average switching frequency of the additional converters is achieved over each respective one of the intervals.

19. The apparatus of claim 18 wherein the predetermined cycle time intervals are half cycle time intervals.

20. A power conversion system having reduced acoustical noise, the system including at least two converters having a distinct average switching frequency; and a controller for generating a respective set of pulse width modulated switching signals for controlling the at least two converters, the controller varying predetermined cycle time intervals so that a respective instantaneous frequency shift relative to the respective average switching frequency of the at least two converters is achieved over each respective one of the intervals.

* * * * *